United States Patent [19]

Sollenberger et al.

[11] 4,149,621

[45] Apr. 17, 1979

[54] ELECTRONIC APPARATUS AND METHOD FOR CONTROL OF CONTAINER ORIENTING MACHINERY

[75] Inventors: L. Emerson Sollenberger, Union City; Herman M. Holdeman, Winchester, both of Ind.

[73] Assignee: Anchor Hocking Corporation, Lancaster, Ohio

[21] Appl. No.: 852,903

[22] Filed: Nov. 18, 1977

[51] Int. Cl.² .............................................. B65G 47/24
[52] U.S. Cl. ...................................... 198/395; 198/399
[58] Field of Search ............... 198/395, 399, 400, 401, 198/394

[56] References Cited

U.S. PATENT DOCUMENTS

| | | | |
|---|---|---|---|
| 3,216,551 | 11/1965 | Peck ..................................... | 198/395 |
| 3,439,792 | 4/1969 | Frank et al. ..................... | 198/394 X |
| 3,493,096 | 2/1970 | Antoszewski et al. .............. | 198/395 |
| 3,920,118 | 11/1975 | Krooss ............................... | 198/395 X |
| 3,958,688 | 5/1976 | Sterling ............................. | 198/395 X |
| 3,997,780 | 12/1976 | Waehner .......................... | 198/394 X |

*Primary Examiner*—Robert B. Reeves
*Assistant Examiner*—James L. Rowland
*Attorney, Agent, or Firm*—Wood, Herron & Evans

[57] ABSTRACT

An electronic control is provided for use with a container conveyor and an orienter, to correct the orientation of an improperly oriented container, or alternatively to turn a container through a controlled arc. In preferred form the electronic control includes an orientation detector which is set up by an operator by means of a mode selector to sense a predetermined shape characteristic of the container as it is moved by a conveyor. The presence or shape of the container is sensed at a time which is controlled by a time sequencer that is synchronized with the operation of the conveyor. If the container is incorrectly oriented or a rotation is desired, the orientation detector activates an actuator which in turn activates the orienter to turn the container.

15 Claims, 7 Drawing Figures

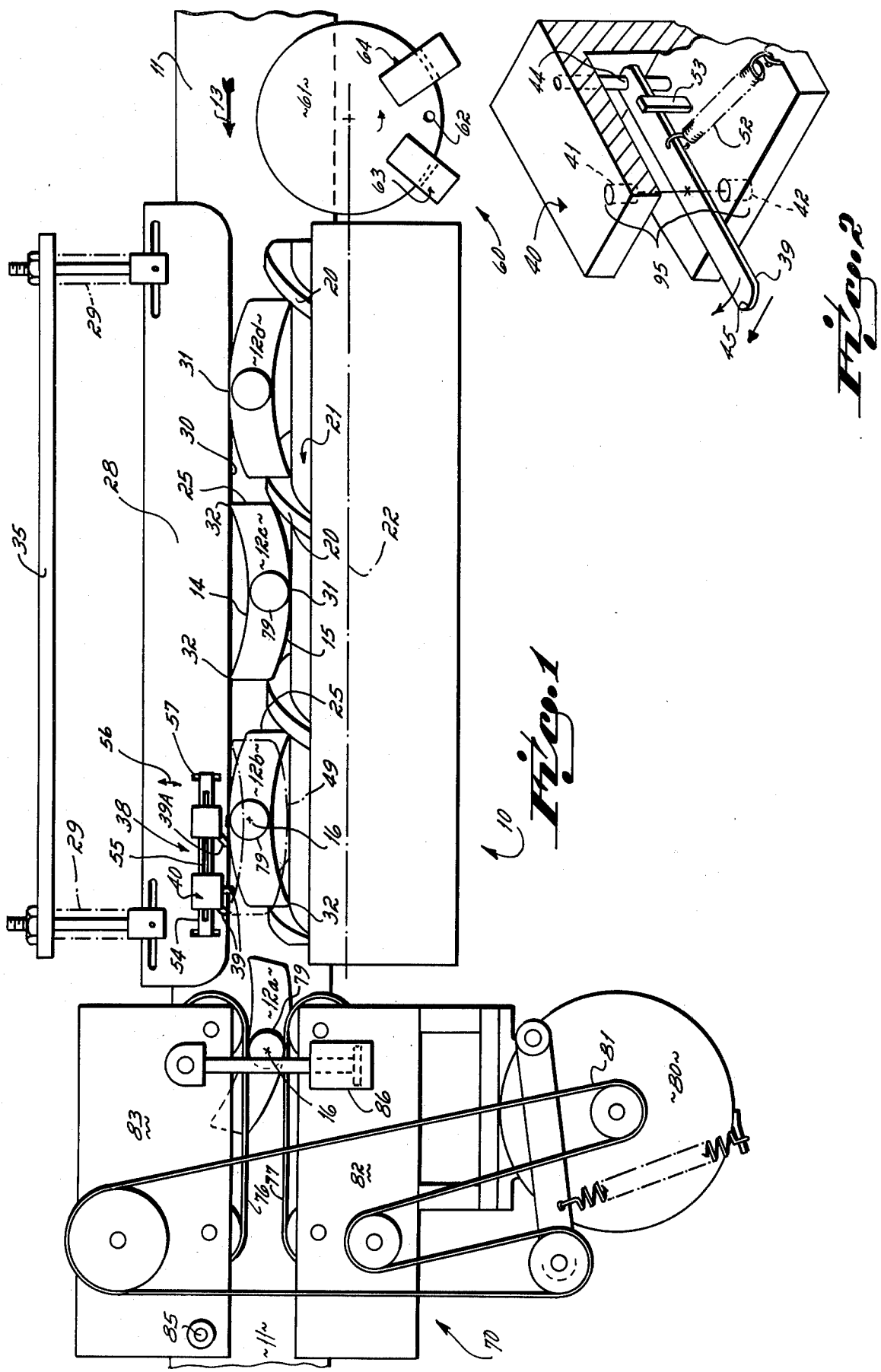

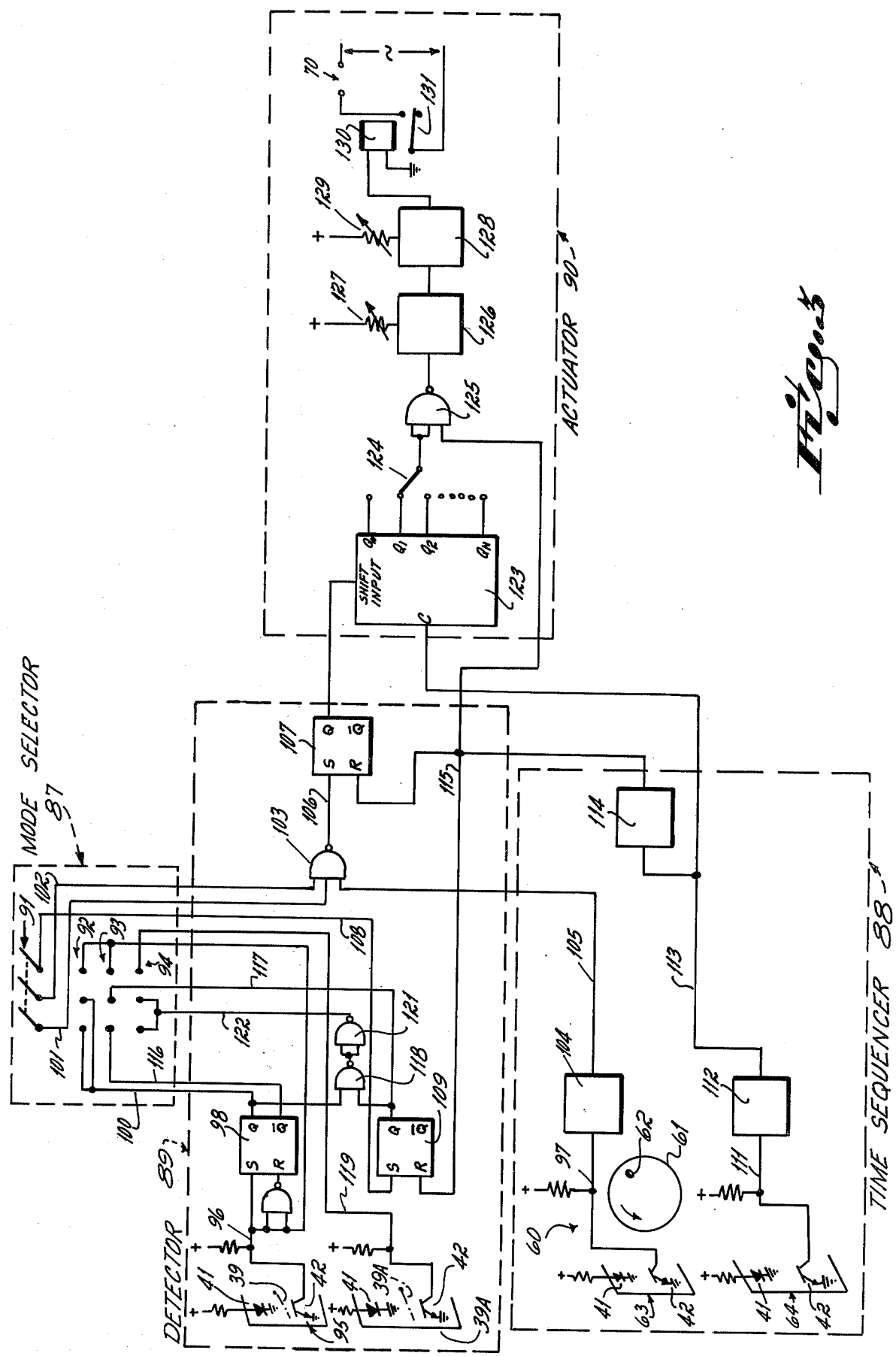

MODE III

ELECTRONIC APPARATUS AND METHOD FOR CONTROL OF CONTAINER ORIENTING MACHINERY

FIELD OF THE INVENTION

This invention relates to apparatus and methods for orienting or turning containers, including non-axially symmetrical articles such as curved glass flasks as well as cylindrically symmetrical bottles. More specifically, in one respect this invention relates to means for detecting those containers moving on a conveyor in single-file relation which are misoriented in the sense of being reversed about a vertical axis with respect to a desired orientation, and providing a signal to container turning apparatus to reorient those which are incorrectly oriented.

BACKGROUND OF THE INVENTION

In the manufacture of hollow containers such as glass flasks, the articles undergo a series of inspections and treatments as they move on conveyors from forming to filling, labeling and packing. For many such operations, for example, in annealing in a lehr, a large group of articles are treated simultaneously while they are arrayed in rows and columns on a wide belt, and their precise orientation is not particularly important. In other operations, however, they are treated or handled sequentially while moving in single-file order on a conveyor.

In some cases it is necessary that articles which are non-symmetrical about a vertical axis, such as flasks, which traditionally are concave-convex in section, be oriented consistently so as to all face the same direction. Proper orientation of flasks is particularly important in filling and labeling, because the equipment usually employed for that purpose does not accommodate improperly oriented flasks and will frequently break or mislabel them.

The orientation of a flask on a production line is initially determined, of course, by the orientation of the mold wherein it is formed. However, subsequent transfers and handling may turn some of the flasks by 180° so that they are oriented reversely from the others.

DESCRIPTION OF THE PRIOR ART

So-called "flask orienters" have been made for detecting those flasks which are misoriented and turning them 180° about a vertical axis so that they are properly oriented. One device for this purpose is shown in U.S. Pat. No. 3,216,551 to Peck. That patent provides a sensor which is energized by a light beam reflected from the side of the flask. If the concave side of the flask is facing the light source, the beam will thereby be concentrated to produce a relatively high intensity reflection, whereas if the flask is reversed, then the convex side will scatter the beam and produce a lower intensity reflection. In another embodiment the patent uses a microswitch that is responsive to the flask shape. The patent also teaches a flask turner for reorienting the flasks which have been detected by the sensor to be improperly oriented. The turner utilizes depending fingers, or plates, that engage the flask on opposite sides to rotate it aoubt a vertical axis.

Frank U.S. Pat. No. 3,439,792 shows apparatus for uniformly orienting "handled" containers, such as syrup bottles, by turning all of the containers until the projecting handles are arrested by a stop. Krooss U.S. Pat. No. 3,920,118 is also concerned with orienting a handled bottle and employs two microswitch fingers which are spring-biased into contact with a vertical surface of the bottle. The fingers are spaced one above the other, and, when one switch senses an open area in the handle portion while the other is in contact with the bottle surface, the difference in actuation of the two switches distinguishes the presence of a handle from the reverse orientation. It also includes a belt for turning the bottles.

Sterling U.S. Pat. No. 3,958,688 uses a ram-type turner, which is operated by a photoelectric scanner.

U.S. Pat. No. 3,997,781 discloses a very sophisticated device, including a video camera with a multiplicity of light pipes, for detecting orientation of labels on rotating containers, and turning the containers so that their labels all face outwardly, which is desirable for packaging the containers in a six-pack.

Powers Manufacturing, Inc., Elmira, N.Y. manufactures and sells a flask orienter which has a microswitch that engages the surface of the flask to detect its orientation as it is conveyed positively by an auger. "Candy" type mechanical time delays control a downstream turner to turn previously detected improperly oriented flasks. The turning mechanism comprises a pair of laterally spaced apart endless belts positioned along either side of the path of travel of the circular necks of the flasks. The belts are constantly driven but are differentially speeded, with the belt on one side of the path of container movement running faster than the belt on the other side. A belt-positioning piston normally holds the belts sufficiently spaced apart so that they do not operatively engage properly oriented flasks. Upon signal from the detector that a misoriented flask is approaching, the belt positioning piston is actuated to shift the belts closer together into neck-engaging position so that they engage the flask neck, or finish, at diametrically opposite points thereon and rotate it by reason of their differential speeds. The piston is automatically actuated to separate after the period required to turn the flask 180° to the desired orientation.

While flask orienters have previously been available, they are either too slow for use at the increasingly rapid rates of travel which modern glass container lines can provide, or they are very expensive. A commercially-available flask orienter discussed above has a maximum speed of operation of only about 50 containers a minute; whereas many lines are capable of running at speeds more than twice that, for example, about 120 containers a minute.

Another difficulty with the previously available equipment has been its unreliability in the very "noisy" environment in which it must work. Glass container lines are exposed to an environment with high vibration, heat and spurious electrical signals. Microswitches that engage the flasks to determine their orientation are subject to undesirably wide fluctuations in the degree of movement necessary to effect positive switch actuation, which results in inconsistent results. Further, previous devices have tended to get out of adjustment rapidly or to break, requiring frequent maintenance.

SUMMARY OF THE INVENTION

The present invention provides an improved apparatus for, and methods of control of, a container orienter which corrects the orientation of a container or rotates the container, as it moves along a conveyor. In a first preferred embodiment the improved control includes an orientation detector. The orientation detector includes means such as a paddle or switch arm actuated by a bottle as the bottle is propelled past the orientation detector, to activate a photoelectric cell. A time sequencer is synchronized with the conveyor. Preferably, the conveyor drives a timing disc with an aperture that activates two additional photoelectric cells, one of which activates the orientation detector at a predetermined time for sensing the orientation of the bottle, the other of which produces clock pulses for timing movement of the bottle to the end of the conveyor whereat the bottle orienter is located. A mode selection is also preferably included in the improved control to provide a selection of different patterns of sensing, by which an operator can set up the orientation detector to sense different shape characteristics. In one use, actuation of the paddle within the predetermined time window indicates whether the bottle is incorrectly oriented, in which case the orientation must be corrected. In another use, the detector may be used merely to indicate the presence of a container so as to actuate the turning mechanism subsequently to rotate it.

When a change of orientation is to be effected, an actuator effectively times the period that is required for the bottle to reach the bottle orienter and to become properly positioned therein. The actuator then activates the bottle orienter for a time sufficient to orient the bottle properly or turn it as desired.

The improved control of the present invention more than doubles the rate at which prior art bottle orienters have operated and, therefore, significantly reduces container handling time. Moreover, the improved control provides flexibility for sensing bottles of different shapes. The improved control provides virtually maintenance-free operation and operates dependably in the noisy environment of a glass factory for reliable control of the bottle orienter.

BRIEF DESCRIPTION OF THE DRAWINGS

The present invention can best be further described by reference to the accompanying drawings, in which:

FIG. 1 is a top plan view, partly broken away, of a flask orienter mechanism associated with the improved control of the present invention, showing a series of flasks, some incorrectly oriented, being conveyed by a feed auger past a detection station and through a turning station;

FIG. 2 is an isometric view, partly in section, of a photoelectric cell apparatus shown in FIG. 1;

FIG. 3 is a schematic circuit diagram of a preferred embodiment of the improved control of the present invention;

FIG. 5, including

Figure 4:
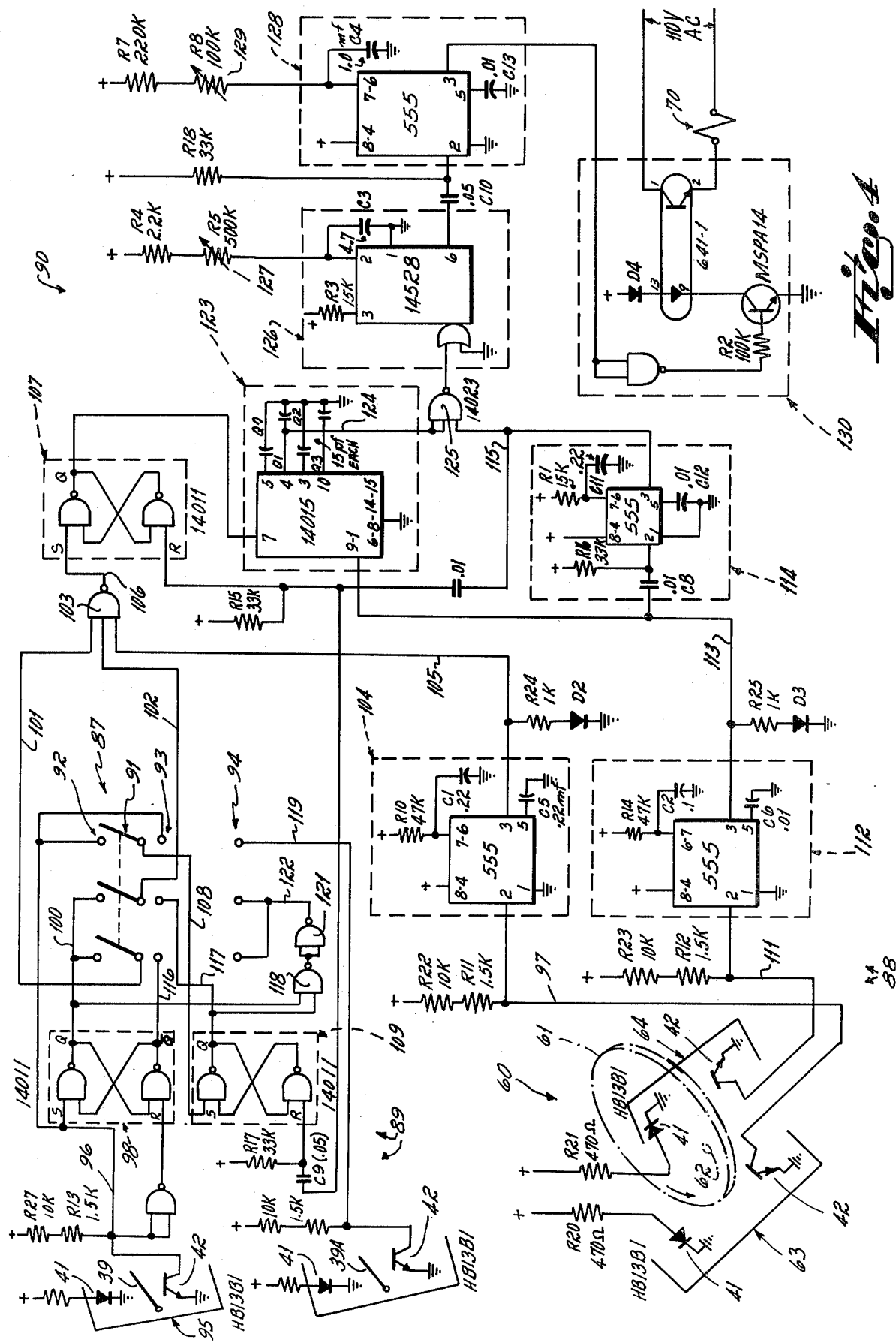
FIG. 4 is a circuit diagram of a representative implementation of the improved control in FIG. 3 for a particular flask orienter mechanism as generally shown in FIG. 1.

A typical environment of the present invention is shown in FIG. 1, wherein a flask orienter mechanism is designated generally by the numeral 10. The orienter is usually mounted for use in conjunction with a conventional single line conveyor belt, designated generally by the numeral 11, which carries a series of flasks 12a, b, c and d in a direction of movement indicated by arrow 13. Each flask 12 has a concave face 14 and a convex face 15. For purposes of description, it will be assumed that the desired, or proper, flask orientation is that of flasks 12b and d, that is, with the convex face 15 oriented toward the top of FIG. 1. As can be seen, flasks 12a and c are reversely oriented and must be turned about their vertical axes 16 for proper orientation.

As the flasks 12 are conveyed by the conveyor belt 11, they are sequentially engaged, spaced, and positioned by the flights 20 on a conventional feed auger or screw 21. The auger 21 is rotated by a motor drive (not shown) about an axis designated at 22 parallel to the direction of movement of the conveyor belt 11. Preferably, the auger 21 carries the flasks 12 in direction 13 at a rate slightly greater than the rate of movement of the conveyor belt 11, so that the trailing, or rear, face 25 of each flask 12 is engaged by an auger flight 20 behind it. Thus the auger 21 controls the position of the flasks 12.

A flask guide 28 is mounted parallel to but spaced from the auger 21 and is biased by resilient springs 29, 29 toward the auger 21 so that the flasks are urged laterally across the conveyor belt 11 against the auger 21. This flask guide 28 has a vertical face designated at 30 which may be of nylon or teflon for smoothness and minimal friction, on which ride the center portions 31 of the convex faces 14 of correctly oriented flasks 12b and d and the vertical corners 32, 32 of the concave faces 14 of those flasks, such as the flask 12c, which are incorrectly oriented. The guide 28 is mounted for lateral movement from a support 35.

As the flasks 12a, b, c and d are conveyed by the auger 21, they pass an orientation detection station, generally designated by the numeral 38. The orientation detection station 38 includes a switch actuating arm or paddle 39 of a photoelectric cell 95 (FIG. 2), which is positioned to engage only the outermost portions of the flasks 12 as they slide along the guide face 30. More particularly, as any flask passes the paddle 39, either its apex line 31 or its vertical corners 32, 32 will contact the paddle 39, depending on flask orientation.

As shown in FIG. 2, movement of the paddle 39 activates a photoelectric cell 95, including a light emitting diode (LED) 41 and a photo detector 42 aligned with the LED. The paddle 39 acts as a shutter between them which is movable by flask contact into or out of the light path, to indicate the presence of a center portion 31 or a corner 32.

In preferred form, as shown in FIG. 2, the station 38 includes a C-shaped body or frame 40 which in one limb mounts the LED indicated by dotted lines at 41, and in an opposite limb a photo detector 42. Such structures are available commercially under the designation HB131 from Photo Darlington, Inc. The paddle 39 is pivotally mounted as at 44 to the frame to swing between light blocking and non-light blocking positions. The paddle 39 has a projecting tip 45 which is positioned to engage the flasks 12.

Referring to the flask shown at 12b in FIG. 1, the tip 45 of paddle 39 is moved out of (alternatively, into) light blocking position as the apex 31 of that flask passes the paddle 39. If a flask is improperly oriented, as is the flask 49 shown in dashed lines in FIG. 1, the paddle 39 will be actuated by the vertical corners 32, 32 as the flask passes the paddle 39. The paddle 39 is positioned so that it will engage the flasks only at the vertical corners 32, 32 or the center portion 31; that is, the paddle 39 will not ride across the entire concave or convex surfaces of the flasks 12. The paddle 39 is biased toward a normal position by a spring 52 (FIG. 2) against a stop 53; as a flask passes, the spring 52 yields, then returns the paddle 39 to normal position.

Use of a paddle 39 and photocell 95, such as that shown in FIG. 2, is desirable because such detectors produce very little electrical noise, in comparison to contact switches. For example, whereas a microswitch will inevitably have a certain amount of "bounce", i.e., rapidly alternating open and closing movements, before it is finally stabilized in either the open or the closed position, the apparatus in FIG. 2 is much more positive and crisp in moving to and from open and closed positions. It should be noted, however, that by reason of the capabilities of the circuitry to be described, other types of apparatus including microswitches may be used.

The paddle 39 should be positioned so that it can be actuated by minimal required travel of the flasks 12 as they pass. For that purpose the switch frame 40 is mounted for adjustable positioning in a direction parallel to arrow 13, on a longitudinal way 54, for example, by a bolt which is slidable in a longitudinal slot 55. The way 54 is itself slidable with respect to the guide 28, for movement in the perpendicular direction 56, in slots 57. The preferred manner in which the orientation station 38 is set up for operation for a given type of flask and desired orientation is described subsequently.

The orientation detection station 38 provides a signal which is indicative of the presence and orientation of a given flask. If a flask is properly oriented, then it can be permitted to pass without change of orientation. On the other hand, if the signal from orientation detection station 38 indicates that a given flask is misoriented, then the circuit operates a downstream article turning means designated generally by the numeral 70, by which the flask is rotated 180° about its vertical axis 16.

One of the major features of this invention is that the circuit is responsive only to those actuations of paddle 39 which occur within a relatively short "time window" which is preestablished in relation to a known position of a flask in a given orientation. More specifically, if the circuit is for example set in a mode to respond to the position of the leading vertical corner 32 of an incorrectly oriented flask ("Mode I"), this time window is established to screen out all signals from orientation detection station 38, except those which occur within a brief period of time during which, by reason of the auger position, the leading corner 32 of the flask is passing the orientation detection station 38, if the flask is incorrectly oriented. The paddle 39 is also actuated by the trailing vertical corner of the improperly oriented flask, but that occurs after the time window has closed and is ineffective to trigger turning. Similarly, the orientation detection station 38 will sense the passage of the center portion 31 of a correctly oriented flask, but again, that will be outside of the time window and the circuit will not respond to it. As another example, if the orientation detection station 38 is set up in a mode that is responsive only to the passage of the center portion 31 of a flask ("Mode II"), then the time window is set to open only for a brief period during which the apex of a flask is passing the orientation detection station 38 if the flask is in a selected orientation; other signals will be disregarded. The orientation detection station 38 can be set up in these and other modes as may be desired to identify orientation of variously shaped containers, as will be described.

The preferred means for establishing this time window in predetermined time relation to the position of a flask, as moved by the auger 21, is the auger movement timing means 60. This means includes a flat, circular disc 61 which is coupled to rotate in synchronism with the auger 21, as indicated diagrammatically in FIG. 1. Specifically, the disc 61 rotates only as the auger 21 rotates and may, for example, be driven off the same shaft. The disc 61 has a light-passing hole or notch 62 adjacent its periphery. A pair of photocells 63 and 64, is provided near the edge of the disc 61 so that the light path between the respective LED's and photo detectors is blocked by the edge of the disc 61, except as the hole 62 swings by. The hole 62, therefore, turns the photocell on as it passes, at a predetermined point in relation to the rotation of the auger 21. Preferably, the disc 61 rotates once for each interval, or cycle, of auger rotation as it carries each successive flask past orientation detection station 38. The auger position indicating disc 61 is set, with respect to the angular orientation of the auger 21, and therefore also with respect to the position of a flask being carried by the auger 21, so that the hole 62 is aligned with photocell 63 (referred to hereinafter as the orientation sample switch), just when the paddle 39 is at the preselected detecting point on the flask, for example, when the leading vertical corner 32 of a flask 49 is passing. If the paddle 39 is operated during the time window, as by the leading vertical corner 32 of an incorrectly oriented flask 49, then the circuit will provide a "turn" signal to the flask turning means 70, appropriately delayed to take into account the time necessary for the flask to be conveyed downstream until it has entered the flask turning means 70. The hole 62 is out of alignment with the orientation sample switch 63 except once per auger cycle; accordingly, the time window is closed when the paddle 39 is actuated at other flask positions, such as the downstream vertical corner 32 of an incorrectly oriented flask. Those actuations of the paddle 39, being out of synchronism with the time window, are disregarded and the flask turning mechanism 70 is unresponsive to them.

The same disc 61 is also preferably used to provide an indication of the "travel time" required for a given container to exit the auger 21. Depending on machine dimensions, several auger rotations and possibly a fractional rotation may occur before the container has moved downstream into the flask turning means 70. The time required for this is metered by a second photocell 64, which may be similar to the photocell 63, and which is also operated by the hole 62 as disc 61 is rotated in synchronism with the auger 21. Each rotation of the disc 61 will cause a pulse of light to pass to the photo detector of photocell 64 and these pulses clock a shift register or other timing means to be described. Therefore, the disc 61 serves two purposes: (1) it initiates a time window within which, and only within which, the orientation detection station 38 is read; and (2) it clocks the travel time as the flask is being conveyed downstream by the auger 21 and/or conveyor belt 11, until sufficient time has elapsed that the flask has arrived at the flask turning means 70.

It should be understood that the flask turning means 70, as distinguished from the means for detecting improperly oriented flasks, does not comprise this invention and may be conventional, for example, in accordance with that supplied by Powers Manufacturing or as shown in the various patents disclosed above.

A suitable form of turning means is shown in FIG. 1 and utilizes a pair of differentially speeded belts 76 and 77 to engage and turn selected flasks. Belt 77 runs over sheaves mounted in a frame or housing 82 and has a run extending parallel to arrow 13, in the direction of flask travel, and in the same horizontal plane as the neck or finish portions 79 of the flask on belt conveyor 11. Belt 76 runs over sheaves mounted on a frame 83, and has a run generally parallel to run 78 of belt 77 but positioned to engage flask necks on a diametrically opposite side thereof. Frame 83 of belt 76 is movable relative to the opposite frame 82, so that belts 76 and 77 can be brought together to engage, or not to engage, flasks to turn them. For this purpose the frame 83 is mounted for pivotal movement about a vertical axle 85, and is actuated to pivot about that axle by a piston 86. As will be described, piston 86 is selectively actuated at times such that the belts will be brought together to engage and rotate a previously detected, improperly oriented flask.

Both belts 76 and 77 can be constantly driven but at different speeds, from a motor drive 80 through a drive belt 81 and suitable reduction means not shown. One belt, for example, belt 77, may move at a speed approximating the speed of the conveyor belt 11, while the other belt, for example, belt 76, may move at a higher or lower rate so that the finish portion 79 of a given flask is engaged between the belts 76 and 77 at diametrically opposite points and is rotated about its vertical axis 16.

The preferred embodiment of the control apparatus and methods of operation in accordance with the present invention will now be described in detail in conjunction with FIGS. 3-5. With reference first to the schematic circuit diagram of FIG. 3, the control apparatus of the present invention includes a mode selector 87, a time sequencer 88, an orientation detector 89, and an actuator 90 for the flask turning means 70.

The mode selector 87 is manually operated to select one of several modes (three in the embodiment shown) for detection of the orientation of the flasks 12. As shown in FIG. 3, the mode selector 87 preferably includes a three pole, triple throw switch 91 to selectively connect the orientation detector 89 for operation in any one of the three modes. When the three pole, triple throw switch 91 is manually operated to a switch position 92, the orientation detector 89 is connected to sense the leading or the trailing vertical corner 32 of the flask 12 as the flask 12 passes the orientation detection station 38 (FIG. 1). When switch 91 is manually operated to a switch position 93, orientation detector 89 is connected to sense the center portion 31 of flask 12. When switch 91 is manually operated to a switch position 94, detector 89 is connected to sense both a leading, or trailing, vertical corner 32 and, simultaneously, the central portion 31 of the flask 12.

Although mode selector 87 is shown to include a three pole, triple throw switch 91, it may include other types of switches, either mechanical, electro-mechanical, or electronic, which can be actuated by an operator to select one of the several modes. Relays, including relays with holding circuits and latching relays, or electronic gates with enable inputs in conjunction with manually operable momentary switches can be substituted for the particular switch 91 shown. These modifications are well within the capability of one of skill in the art and are not described further. Nevertheless, these modified forms of the mode selector 87 are contemplated by the present invention.

As indicated above, orientation detector 89 is connected differently by manual operation of the mode selector 87 for each of the various modes of operation. Setup of orientation detector 89 by adjustment of the position of the paddle 39, paddle 39A and respective photocells, by means of adjustment of the switch frame 40, in relation to the position of the hole 62 in the disc 61 to the photocells 63 and 64 will be described for each mode.

Mode I

As indicated above, when the mode selector 87 is set for Mode I, orientation detector 89 senses one of the vertical corners 32 of flask 12. Specifically, switch 91 is manually set at switch position 92.

The disc 61 is rotated, for example, by rotation of auger 21 by hand, so that hole 62 therein is aligned between LED 41 and photo detector 42 of orientation sample switch 63. A correctly oriented flask 12, such as the flask 12b which is concave upward as viewed in FIG. 1, is placed in auger 21 with either its leading or trailing vertical corner 32, as desired, proximate the position of the paddle 39. Switch frame 40 is then moved longitudinally and/or transversely to adjust the position of the paddle 39 in relation to a vertical corner 32 of the flask 12. Thereafter, an incorrectly oriented flask 12, such as flask 12c which is concave downward as viewed in FIG. 1, is placed in the auger 21. Placement of an incorrectly oriented flask 12 in the auger 21 causes actuation of the paddle 39 so that the photocell 95 is activated. Consequently, the collector of the photo detector 42 which is connected to a lead 96 assumes a logic zero signal level.

The lead 96 is connected to the set input of a flask detector latch 98. When a vertical corner 32 is sensed, therefore, and a logic zero signal level appears at the set input of the flask detector latch 98, the flask detector latch 98 transposes such that a logic one signal level appears at the Q output of the flask detector latch 98.

The Q output of the flask detector latch 98 is connected by a lead 100, to two poles of the three pole, triple throw switch 91 and by two leads 101 and 102 to each of two inputs to a detector sample NAND gate 103.

During the setup phase for Mode I operation, the hole 62 is aligned with the LED 41 and the photo detector 42 of the orientation sample switch 63 included in the time sequencer 88. Consequently, the collector of the photo detector 42 assumes a logic zero signal level.

A lead 97 connects the collector of photo detector 42 to a pulse generator 104, which produces a logic one signal level output during the setup phase. The output of pulse generator 104 is connected by a lead 105 to the other input of the detector sample NAND gate 103.

As a result of the setup phase for Mode I operation, whenever a bottle edge passes the paddle 39, a logic one signal level appears at two of the inputs to detector sample NAND gate 103. Unless, however, the hole 62 is aligned between the LED 41 and the photo detector 42 of the orientation sample switch 63, the detector sample NAND gate 103 produces a logic one signal level output. Detector sample NAND gate 103 transposes to a logic zero signal level only if a vertical corner 32 is present and the hole 62 is aligned between the LED 41 and the photo detector 42 of the orientation sample switch 63. This condition occurs only when the leading or the trailing vertical corner 32, whichever case is desired, is present during the time window set by operation of the orientation sample switch 63 in conjunction with the pulse generator 104.

If an incorrectly oriented flask 12 is sensed, and a logic zero signal level appears on a lead 106 at the output of the detector sample NAND gate 103, an incorrect orientation latch 107 is set.

Mode II

As indicated above, when mode selector 87 is manually set in Mode II, the orientation detector 89 senses the center portion of a flask 12 to determine whether or not the flask 12 is correctly oriented. Specifically, the three pole, triple throw switch 91 is manually operated to the switch position 93.

The auger 21 is rotated by hand to align the hole 62 between LED 41 and photo detector 42. An incorrectly oriented flask 12, such as the flask 12c which is convex downward as viewed in FIG. 1, is placed in auger 21 so that the center portion 31 of flask 12 is located opposite to paddle 39, but does not actuate the paddle. Thereafter, a correctly oriented flask 12, such as the flask 12b which is convex upward as viewed in FIG. 1, is placed in the auger 21 so as to ascertain that the correctly oriented flask 12 does activate the paddle 39.

In Mode II operation, as incorrectly oriented flask 12c passes the orientation detection station 38, the leading vertical corner 32 of incorrectly oriented flask 12 actuates the paddle 39. This produces a logic zero signal level on lead 96. One pole of the three pole, triple throw switch 91 connects lead 96 to a lead 108 which is in turn connected to the set input of a time frame latch 109. When a logic zero signal level appears at the set input of the time frame latch 109, the time frame latch 109 transposes so that a logic one signal level appears at the Q output, which is connected by a lead 117, one pole of the three pole, triple throw switch 91 and lead 102 to one input of detector sample NAND gate 103.

The logic one signal level on the lead 101 continues for a predetermined time interval. Specifically, as disc 61 continues to rotate, the hole 62 becomes aligned with LED 41 and photo detector 42 of clock switch 64. When the hole 62 becomes so aligned, a logic zero signal level appears on a lead 111 which is connected to a pulse generator 112. The output of the pulse generator 112 is connected by a lead 113 to a time delay 114. Consequently, a predetermined time after hole 62 becomes aligned with LED 41 and photo detector 42 of clock switch 64, time delay 114 produces a pulse on a lead 115 which resets the time frame latch 109.

If an incorrectly oriented flask 12 is present, at the time the hole 62 becomes aligned with LED 41 and photo detector 42 of the orientation sample switch 63, a logic one signal level will appear at all three inputs to the detector sample NAND gate 103. Specifically, the paddle 39 will not be actuated by the center portion of an incorrectly oriented flask 12. Consequently, a logic one signal level appears at the set input of the flask detector latch 98 so as to produce a logic one signal level at the Q̄ output which is connected to one input of the detector sample NAND gate 103 by a lead 116, one pole of the three pole, triple throw switch 91 and lead 101.

Also, when hole 62 is aligned with LED 41 and photo detector 42, a logic one signal level appears on lead 105 at another input of the detector sample NAND gate 103. Finally, for a predetermined time interval after alignment of hole 62, a logic one signal level appears at the Q output of the time frame latch 109, which is connected to a last input of the detector sample NAND gate 103 by a lead 117, one pole of the three pole, triple throw switch 91 and the lead 102. If these three conditions exist, the detector sample NAND gate 103 assumes a logic zero signal level so as to cause the incorrect orientation latch 107 to transpose such that a logic one signal level appears on the Q output to indicate an incorrectly oriented flask 12.

The time frame latch 109 is included in the orientation detector 89 in Mode II operation so as to prevent transposition of the Q output of the incorrect orientation latch 107 to the logic one signal level unless there is actually an incorrectly oriented flask in the auger 21. Specifically, if the time frame latch 109 were not included in the orientation detector 89, the incorrect orientation latch 107 could produce a logic one signal level at the Q output if no flask were present in the auger 21. The time frame latch 109 actually serves to indicate that a flask 12 is present in the proximity of the orientation detector station 38 by a check to see that a vertical corner 32 first actuates the paddle 39 before the absence of a subsequent actuation of the paddle 39 within the predetermined time interval will indicate an incorrectly oriented flask 12. (If a flask 12 were not present at the orientation detection station 38, the paddle 39 would not have been actuated.) Consequently, orientation detector 89 will not indicate the presence of an incorrectly oriented flask such as to trigger the actuator 90 to operate the flask turning means 70, if no flask is present during Mode II operation.

Mode III

To set up Mode III operation, the three pole, triple throw switch 91 is manually operated to the switch position 94. The auger 21 is rotated by hand so that the hole 62 is aligned with the LED 41 and the photo detector 42 of the orientation sample switch 63. A correctly oriented flask 12, such as the flask 12b which is concave downward as viewed in FIG. 1, is placed in the auger 21 so that a vertical corner 32 of the flask 12 is proximate the paddle 39. The switch frame 40 is then adjusted so that, when an incorrectly oriented flask 12, such as the flask 12c which is convex downward as viewed in FIG. 1, is placed in the auger 21, paddle 39 is actuated. In Mode III, a second paddle 39A on the switch frame 40 is positioned proximate the center portion of the incorrectly oriented flask 12. Thereafter a correctly oriented flask 12 is placed in the auger 21 to assure that the paddle 39A is actuated by the correctly oriented flask 12.

In Mode III operation, the leading vertical corner 32 of an incorrectly oriented flask 12 first actuates the paddle 39A during movement in the direction 13 in FIG. 1. When the paddle 39A is actuated, a logic zero signal level appears on the lead 119 which is connected to the set input of the time frame latch 109 by one pole of the three pole, triple throw switch 91 and the lead 108. Consequently, the time frame latch transposes to produce a logic one signal level at the Q output. The Q output of the time frame latch 109 is connected to one input of a coincidence NAND gate 118 by the lead 117.

The logic one signal level on the lead 117 continues for a predetermined time interval as for the Mode II operation described above. Specifically, after the paddle 39A is actuated, the disc 61 rotates so that the hole 62 becomes aligned with the LED 41 and the photo detector 42 of the clock switch 64. This produces a logic zero signal level on the lead 111 which activates the pulse generator 112 to produce a clock pulse on the lead 113. The clock pulse activates the time delay 114 which assumes a logic one signal level after a predetermined time. The output of the time delay 114 is connected to the reset input of the time frame latch 109 by the lead 115. Therefore, the logic one signal level on the lead 117 continues until the time delay 114 operates in response to the clock pulse.

It is during this predetermined time interval that actuation of the paddle 39 by the leading vertical corner 32 of an incorrectly oriented flask 12 will occur. If the flask is incorrectly oriented, the leading vertical corner 32 actuates the paddle 39 to produce a logic zero signal level on the lead 96. This sets the flask detector latch 98 so that a logic one signal level appears at the Q output. The Q output of the flask detector latch 98 is connected by the lead 100 to the other input to the coincidence NAND gate 118.

Logic one signal levels on the two inputs to the coincidence NAND gate indicate that the paddle 39 is actuated and the paddle 39A is not actuated within the predetermined time interval. In this case the coincidence NAND gate 118 assumes a logic zero signal level which causes an inverter 121 to transpose to a logic one signal level. The logic one signal level at the output of the inverter 121 is connected by a lead 122, two poles of the three pole, triple throw switch 91 and the leads 101 and 102 to two inputs of the detector sample NAND gate 103.

If the hole 62 becomes aligned with the LED 41 and the photo detector 42 of the orientation sample switch 63, the lead 97 is placed at a logic zero signal level to activate the pulse generator 104 which produces a logic one signal level on the lead 105. The lead 105 is connected to the other input of the detector sample NAND gate 103.

Therefore, if during the predetermined time interval the paddle 39 is actuated by a vertical corner 32 and the paddle 39A is not actuated by the center portion 31 of a flask 32, both of which conditions occur simultaneously in the case of an incorrectly oriented flask 12, at the time the orientation sample switch 63 is activated, the orientation sample NAND gate 103 transposes to a logic zero signal level to set the incorrect orientation latch which indicates that an incorrectly oriented flask is present. The employment of the dual sensors, that is, the paddles 39 and 39A, increases the accuracy of the orientation detector 89 and minimizes errors due to slight variations in the physical dimensions of the flask 12 being inspected.

Regardless of the mode of operation, the Q output of the incorrect orientation latch 107 is connected to the shift input of a shift register 123 in the actuator 90. The shift register 123 has N registers as shown in FIG. 3. The clock input of the shift register 123 is connected to the lead 113.

Whenever the hole 62 passes between the LED 41 and the photo detector 42 of the clock switch 64, a logic zero signal level pulse appears on the lead 111 which causes pulse generator 112 to produce a logic one signal level pulse, or clock pulse, on lead 113 which is connected to the clock input C of shift register 123, to shift the output of the incorrect orientation latch 107 into register 123. Consequently, dependent upon whether an incorrectly or correctly oriented flask 12 passes orientation detection section 38, a logic one or a logic zero signal level will be shifted into the shift register 123.

As flask 12 continues to move along auger 21, the indication signal of whether that particular flask is incorrectly or correctly oriented is shifted through the shift register 123 by operation of the clock switch 64. At such time as the flask 12 exits the auger 21, the indication of whether or not the particular flask 12 is incorrectly oriented appears at one of the shift register outputs $Q_O, Q_1, \ldots Q_N$. The auger may rotate several times before the flask reaches the turner. Such rotation may, for example, cause the indicator to shift twice, first into shift register 123 to the $Q_O$ register and then into the $Q_1$ register of shift register 123.

If the flask is incorrectly oriented, a logic one signal level appears at the $Q_I$ output of the shift register 123 which is connected by a switch 124 to two inputs of a control NAND gate 125. The other input of control NAND gate 125 is connected to the output of time delay 114. This synchronizes the operation of actuator 90 so that the indication of whether or not an incorrectly oriented flask 12 is present is first shifted into the $Q_I$ register before it is effectively checked by the control NAND gate 125 to determine whether or not the flask turning means 70 should be activated.

If the indication in $Q_I$ register of shift register 123 is that a correctly oriented flask 12 was sensed, the output of control NAND gate 125 assumes a logic one signal level. Consequently, a position timer 126 is not activated.

If, however, an incorrectly oriented flask 12 was sensed, a logic one signal level appears at the two inputs to the control NAND gate 125 at such time as the time delay 114 times out. Consequently, control NAND gate 125 assumes a logic zero signal level which activates the position timer 126.

The position timer 126 produces a time delay which is adjustable by means of a potentiometer 127. A predetermined time after control NAND gate 125 is activated to indicate that an incorrectly oriented flask 12 has exited the auger 21, the position timer 126 activates a dwell timer 128. The position timer 126 assures that the incorrectly oriented flask 12 has moved along to the belts 76 and 77 of the flask turning means 70 before the flask turning means 70 is activated.

The dwell timer 128 activates a relay 130 for a predetermined time which is determined by adjustment of a potentiometer 129. The relay 130 closes a movable contact 131 and connects the flask turning means 70 in circuit with a voltage source to operate a conventional valve that in turn applies pressure to piston 86. The potentiometer 129 is adjusted so that the dwell timer 128 activates the flask turning means 70 for a period of time sufficient to rotate the flask 180 degrees from the position in which the flask 12 enters between the belts 76 and 77.

A specific implementation of the schematic circuit diagram in FIG. 3 is shown in FIG. 4. The correspondence between elements in FIG. 3 and those in FIG. 4 is shown by means of like numerals. The values for the components, such as resistors and capacitors, is shown in FIG. 4, and electronic components are identified in FIG. 4 by type. It should be noted that some connections, such as the connection of the outputs of the shift register 123, and some parametric values, as for potentiometers 127 and 129, are dependent upon the particular dimensions, speed of operation, and other factors relative to the auger 21 and the flask turning means 70. As shown in FIG. 4, for example, the time period for the dwell timer 128 is 820 milliseconds, but this is of course dependent on the speed of the belts 76 and 77 of the flask turning means 70 and can vary from one installation to another.

FIG. 4 is intended primarily to indicate types and values of components which can be used to construct the schematic circuit diagram of FIG. 3, and to show that the preferred implementation employs electronic components with fast operation. This permits high speed operation of the flask orientation apparatus to increase the speed and efficiency of the line.

Figure 5A:
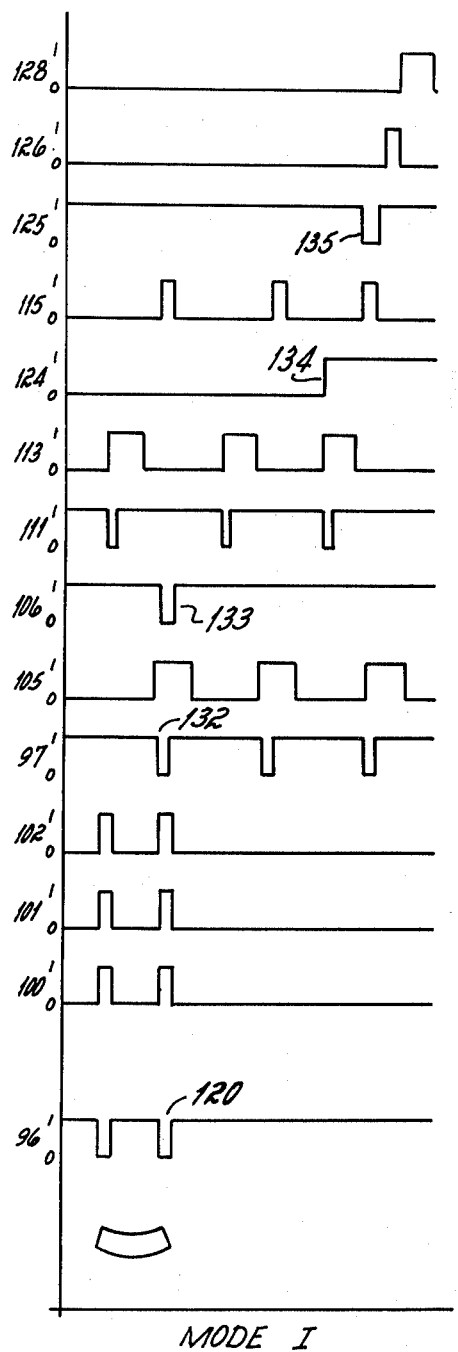
FIGS. 5A, 5B and 5C, is a time diagram for operation of the improved control of FIG. 3.
Figure 5B:
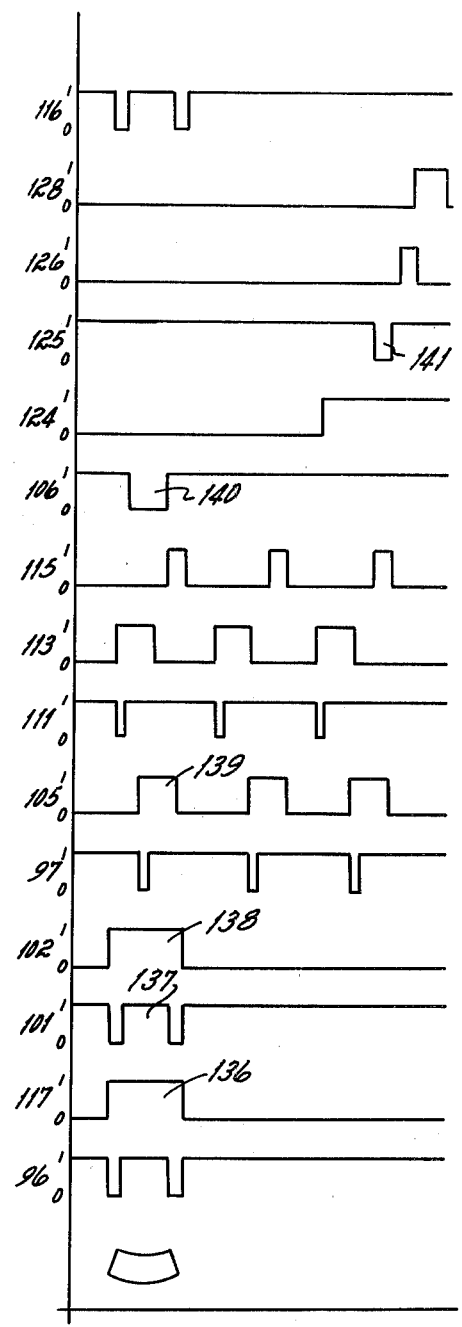
Figure 5C:
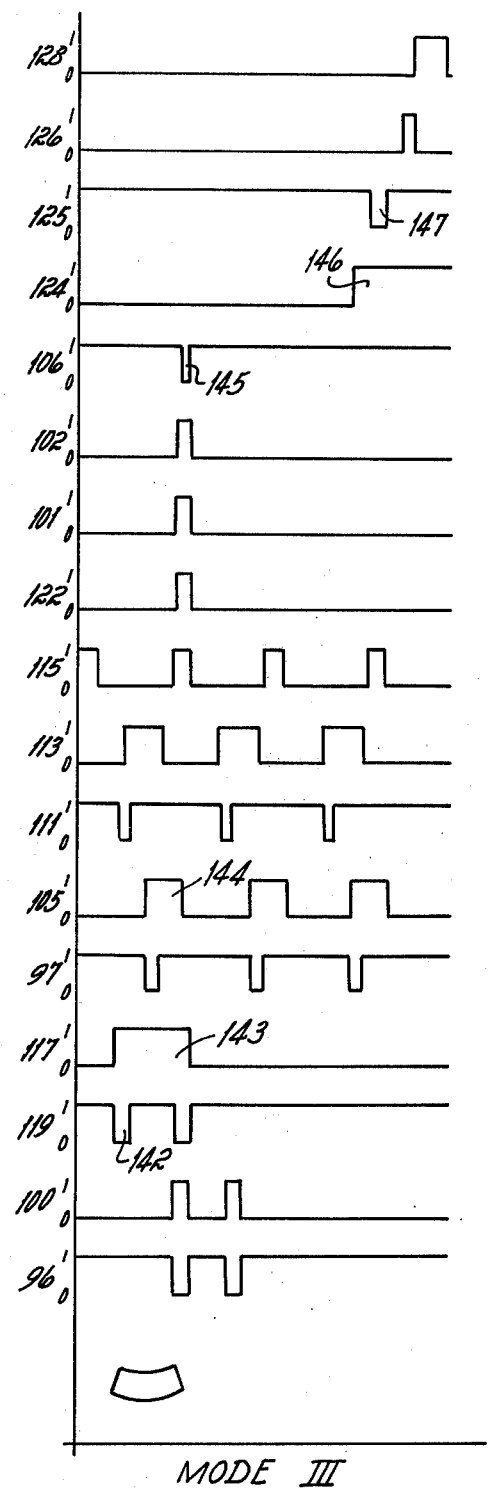

The operation of the control apparatus will now be briefly described in connection with the schematic circuit diagram of FIG. 3 and the timing diagram of FIG. 5. FIG. 5 includes FIG. 5A, which relates to Mode I operation; FIG. 5B, which relates to Mode II operation; and FIG. 5C, which relates to Mode III operation. The operation will be described in connection with passage of an incorrectly oriented flask past the orientation detection station 38 with the understanding that a correctly oriented flask will have a different effect based on the geometry which is sensed so as not to activate flask turning means 70.

In Mode I, as an incorrectly oriented flask 12 passes the orientation detection station 38, a vertical corner 32 actuates paddle 39 at the time that the hole 62 is aligned with the LED 41 and the photo detector 42 of the orientation sample switch 63. This produces coincident logic zero signal levels on the leads 96 and 97 as shown at 120 and 132 in FIG. 5A.

A logic zero signal level on the lead 96 causes the flask detector latch 98 to produce a logic one signal level on the leads 101 and 102 while the logic zero signal level on the lead 97 causes the pulse generator 104 to produce a logic one signal level on the lead 105 at the inputs to the detector sample NAND gate 103. The detector sample NAND gate 103 produces a logic zero signal level on the lead 106 as indicated at 133 in FIG. 5A, which sets the incorrect orientation latch 107 to produce a logic one signal level at the Q output.

As the hole 62 rotates between the LED 41 and the photo detector 42 of the clock switch 64, clock pulses appear on the lead 113 so as to clock the shift register 123 to shift the Q output of the incorrect orientation latch 107 first to the $Q_0$ register and then to the $Q_1$ register of the shift register 123 so as to produce a logic one signal level on the switch 124, as indicated at 134 in FIG. 5A. A short time after the indication is shifted to the $Q_1$ register, the time delay 114 produces a logic one signal level on the lead 115 which causes the control NAND gate 125 to transpose a logic zero signal level for the duration of the pulse from the time delay 114 as indicated at 135 in FIG. 5A.

The control NAND gate 125 activates the position timer 126 which produces a delay to allow the flask 12 to travel to belts 76 and 77 and thereafter activates the dwell timer 128. The dwell timer 128 activates the flask turning means 70 for a sufficient period to cause a 180-degree rotation of the flask 12 to correct orientation.

In Mode II, the paddle 39 first senses a vertical corner 32 of the incorrectly oriented flask 12 so as to produce a logic zero signal level on lead 96 which in turn causes the time frame latch 109, as indicated at 136 in FIG. 5B, to produce a logic one signal level on the lead 102 at one input to the detector sample NAND gate 103. This initiates a time interval, during which actuation of the paddle 39 ceases such that the flask detector latch 98 produces a logic one signal level on the lead 101 at another input to the detector sample NAND gate 103 as indicated at 137 in FIG. 5B. Also, the hole 62 becomes aligned with the LED 41 and the photo detector 42 of the orientation sample switch 63 so as to produce a pulse on the lead 97 which causes the pulse generator 104 to produce a logic one signal level on the lead 105 which is connected to the other input to the detector sample NAND gate 103. Consequently, coincidence of logic one signal levels on the leads 101, 102 and 105, as indicated at 137, 138 and 139 in FIG. 5B, causes the detector sample NAND gate 103 to produce a logic zero signal level on the lead 106, as indicated at 140 in FIG. 5B.

The logic zero signal level on the lead 106 causes the incorrect orientation latch 107 to produce a logic one signal level at the Q output which is clocked into and through the shift register 123 in response to clock pulses on the lead 113 as the hole 62 rotates through the clock switch 64. The indication of an incorrectly oriented flask 12 ultimately appears in the form of a logic one signal level on the switch 124 and, a short time later, time delay 114 produces a logic one signal level which causes the control NAND gate 125 to transpose to a logic zero signal level, as indicated at 141 in FIG. 5B.

The pulse from the control NAND gate 125 activates the position timer 126 which in turn activates the dwell timer 128. This first assures that the flask 12 is between the belts 76 and 77 and then operates the flask turning means 70 for a sufficient period to turn flask 12.

In Mode III, the vertical corner 32 of the flask 12 first actuates the second paddle 39A so as to produce a logic zero signal level on the lead 119, as indicated at 142 in FIG. 5C. The logic zero signal level on the lead 119 causes the time frame latch 109 to produce a logic one signal level on the lead 117 at one input to the coincidence NAND gate 118, as indicated at 143 in FIG. 5C. During the time interval which is established by the time frame latch 109, the vertical corner 32 of the flask 12 actuates the paddle 39 so as to produce a logic zero signal level on the lead 96 which causes the flask detector latch 98 to produce a logic one signal level on the lead 96 which causes the flask detector latch 98 to produce a logic one signal level on the lead 100 at the other input to the coincidence NAND gate 118.

Coincidence of the logic one signal levels on the leads 117 and 100 causes the coincidence NAND gate 118 to transpose to a logic zero signal level which in turn causes the inverter 121 to assume a logic one signal level which appears on the leads 101 and 102 at two inputs to the detector sample NAND gate 103. When the hole 62 passes the orientation sample switch 63, a logic zero signal level appears on the lead 97 which causes the pulse generator 104 to produce a logic one signal level on the lead 105 at the other input to the detector sample NAND gate 103, as indicated at 144 in FIG. 5C. This causes the detector sample NAND gate 103 to transpose to a logic zero signal level which appears on the lead 106, as indicated at 145 in FIG. 5C, and which sets the incorrect orientation latch 107 to a logic one signal level at the Q output.

As the hole 62 passes the clock switch 64, clock pulses appear on the lead 113 which shift the Q output of the incorrect orientation latch 107 into and through the shift register 123. After two such clock pulses, the indication of an incorrectly oriented flask 12 in the form of a logic one signal level appears on the switch 124, as indicated at 146 in FIG. 5C.

A short time thereafter, the time delay 114 produces a logic one signal level on the lead 115, which together with the logic one signal level on the lead 124 causes the control NAND gate 125 to transpose to a logic zero signal level, as indicated at 147 in FIG. 5C. Consequently, the pulse from the control NAND gate 125 causes the position timer to delay operation of the flask turning means 70 until the flask 12 passes between the belts 76 and 77 and then activates the dwell timer 128.

The dwell timer 128 then activates the flask turning means 70 for a time period sufficient to rotate the flask.

Use in Rotating Round Containers

Apart from the flask orienting use described above, the present invention is also useful for reorienting containers by rotating them through a desired arc, regardless of their initial orientation. This may be done with round containers as well as with flasks and asymmetrical containers. By way of example, such controlled rotation is useful while a container is being given a "hot end coating" that deposits a scratch resistant titanate and/or tin compound on its outer surface, to insure a more uniform coating.

It is conventional on present glass container lines to expose the hot, newly formed containers to vapor of a pyrolysable compound such as titanium tetrachloride, which decomposes on contact with the glass surface to provide a thin, transparent, scratch-resistant coating on the container. At present this is done by moving the containers on a conveyor through an open ended tunnel, in which they are exposed to a mist, vapor or spray of the pyrolysable compound.

The spray may be applied from nozzles, along the path of container movement, and the sides of the containers facing the nozzles often receive a relatively heavier deposit of the protective coating than other portions of the container surface. Moreover, undesirably high losses of the treating compound result from the need to establish a concentration within the tunnel that will adequately coat the portions of the containers not directly facing the nozzles.

This invention may be used to detect the approach of the individual containers to the hot end treating tunnel and to operate bottle rotating means within the tunnel so that the respective containers are rotated while they pass before the vapor nozzles, for example, by 90° to insure even exposure. The circuit may simultaneously actuate a valve in the vapor supply line so that the treating vapor is injected into the tunnel, only when a container is being rotated as it is passing the vapor nozzles.

It will be understood that for such use, the circuit can be used to detect round (cylindrical) containers, for example by setting it in Mode II, so that it will sense the rounded sidewall of the containers. From what has been said, those skilled in the art can readily use the invention for this and other container rotating purposes.

While the invention has been disclosed herein in relation to preferred embodiment, the method and apparatus are not limited to that precise embodiment, but include other embodiments falling within the scope and the spirit of the claims.

What is claimed is:

1. In apparatus for orienting hollow containers, including a conveying means for moving a series of containers in a single line sequence past detecting means for sensing the passage of a container therepast and a container turning means under control of the detecting means for selectively turning respective detected containers, wherein the container turning means is spaced from the detecting means and the containers are moved in sequence by the conveying means from the detecting means to the container turning means, the improvement in the detecting means for sensing the containers and subsequently selectively actuating the container turning means to turn the containers, comprising:

a detection station proximate the conveying means, including a detector actuated by the presence of a predetermined physical portion of a container for producing a first signal, a timing means responsive to movement of the conveying means for producing second signals at predetermined times synchronized to the rate of movement of the conveying means, a time sequencer connected to the timing means and responsive to the second signals, including a sample means for producing a time window signal and a clock means for producing clock signals, detector sample means connected to the detector and to the time sequencer and responsive to the simultaneous occurrence of both the first signal and the time window signal for producing an indication signal representative of the presence of the predetermined physical portion of the container at the detector at a predetermined time in the movement of the conveying means, and actuator means connected to the clock means and the detector sample means and responsive to the clock signals and the indication signal for actuating the container turning means for turning the container a preselected amount when the container is in position for turning.

2. The apparatus in claim 1 wherein the detector includes:

a photocell having a light-emitting diode and a photo detector, and a paddle means, including a paddle disposed in the container path normally spring-biased against a stop for blocking the light from the light-emitting diode from impinging on the photo detector, the paddle being moved against the spring bias away from the stop for permitting the light from the light-emitting diode to impinge on the photo detector when actuated by a container so as to produce the first signal at the output of the photo detector.

3. The apparatus in claim 1 wherein the second means includes:

an opaque rotating disc driven by the conveying means and having a hole, and an orientation sample switch, including a photocell having a light-emitting diode and a photo detector, the opaque rotating disc normally for blocking the light from the light-emitting diode from impinging on the photo detector, the hole being cyclically rotated between the light-emitting diode and the photo detector for permitting the light from the light-emitting diode to impinge on the photo detector so as to produce a second signal at the output of the photo detector.

4. The apparatus in claim 1 wherein each container includes a first vertical corner and a second vertical corner and a convex center portion mediate the first and second vertical corners and wherein one of the first and second vertical corners and/or the convex center portion is the predetermined physical portion by which the detector is actuated to produce the first signal and wherein the timing means produces a second signal at the time the conveying means moves one of the first and second vertical corners and/or the convex center portion into position to actuate the detector so as to produce the time window signal only at the time one of the first and second vertical corners and/or the convex center portion passes the detection station.

5. The apparatus in claim 4 wherein the detector sample means includes a NAND gate responsive to the simultaneous occurrence of the first signal and the time window signal to set an incorrect orientation means for producing the indication signal.

6. The apparatus in claim 5 wherein the actuator means includes:
a shift register means having a shift input connected to the incorrect orientation means, a clock input connected to the clock means and N registers, and control means connected to one of the N registers for producing a control signal when the indication signal is shifted into the one register for producing a control signal for actuating the container turning means.

7. The apparatus in claim 6 wherein the actuator means further includes:
an adjustable position timer means connected to the control means and responsive to the control signal for timing a period necessary for the container to become properly positioned in the container turning means for turning and for producing a third signal for actuating the container turning means.

8. The apparatus in claim 7 wherein the actuator further includes:
an adjustable dwell timer means connected to the adjustable position timer means and responsive to the third signal for actuating the container turning means for turning the container the preselected amount.

9. The apparatus in claim 4 further including a mode selector means for selecting one of a first mode, a second mode and a third mode and wherein the mode selector means is connected between the detector and the detection sample means, the first signal in the first mode for representing one of the first and second vertical corners is present at the detection station, the first signal in the second mode for representing the convex center portion is not present at the detection station and the first signal in the third mode for representing both one of the first and second vertical corners is present and the convex center portion is not present at the detection station.

10. A method for orienting hollow containers wherein a conveying means moves a series of containers in single line sequence past detecting means that sense the passage of a container therepast and a container turning means under control of the detecting means that selectively turns respective detected containers, wherein the container turning means is spaced from the detecting means and the containers are moved in sequence by the conveying means from the detecting means to the container turning means,
the improvement in sensing the containers and subsequently selectively actuating the container turning means to turn the containers, including the steps of:
sensing the presence of a predetermined physical portion of a container and producing a first signal by means of a detector at a detection station proximate the conveying means,
producing second signals at predetermined times synchronized to the rate of movement of the conveying means by means of a timing means responsive to movement of the conveying means,
producing a time window signal in response to the second signals by means of a sample means,
producing clock signals in response to the second signals,
producing an indication signal in response to the simultaneous occurrence of both the first signal and the time window signal representative of the presence of the predetermined physical portion of the container at the detector at a predetermined time in the movement of the conveying means, and
actuating the container turning means for turning the container a preselected amount when the container is in position for turning in response to the clock signals and the indication signal.

11. The method of claim 10 wherein each container includes a first vertical corner and a second vertical corner and a convex center portion mediate the first and second vertical corners and wherein one of the first and second vertical corners and/or the convex center portion is the predetermined physical portion sensed for producing the first signal and wherein a second signal is produced at the time the conveying means moves one of the first and second vertical corners and/or the convex center portion into position so as to produce the time window signal only at the time one of the first and second vertical corners and/or the convex center portion passes the detection station.

12. The method of claim 11 further including the step of:
setting an incorrect orientation means in response to the simultaneous occurrence of the first signal and the time window signal so as to produce the indication signal.

13. The method of claim 10 further including the step of:
timing a period necessary for the container to become properly positioned in the container turning means by means of an adjustable position timer means.

14. The method of claim 13 further including the step of:
actuating the container turning means for turning the container the preselected amount by means of an adjustable dwell timer means.

15. The method of claim 11 further including the step of:
selecting one of a first mode, a second mode and a third mode by means of a mode selector means, the first signal in the first mode for representing one of the first and second vertical corners is present at the detection station, the first signal in the second mode for representing the convex center portion is not present at the detection station and the first signal in the third mode for representing both one of the first and second vertical corners is present and the convex center portion is not present at the detection station.

* * * * *